(12) United States Patent
Zhang et al.

(10) Patent No.: US 11,573,719 B2
(45) Date of Patent: Feb. 7, 2023

(54) PMEM CACHE RDMA SECURITY

(71) Applicant: Oracle International Corporation, Redwood Shores, CA (US)

(72) Inventors: Wei Zhang, Foster City, CA (US); Jia Shi, Campbell, CA (US); Zuoyu Tao, Belmont, CA (US); Kothanda Umamageswaran, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/831,337

(22) Filed: Mar. 26, 2020

(65) Prior Publication Data
US 2021/0303154 A1 Sep. 30, 2021

(51) Int. Cl.
*G06F 3/06* (2006.01)
*G06F 12/1081* (2016.01)
*G06F 9/38* (2018.01)
*G06F 16/906* (2019.01)

(52) U.S. Cl.
CPC .............. *G06F 3/064* (2013.01); *G06F 3/067* (2013.01); *G06F 3/0646* (2013.01); *G06F 3/0685* (2013.01); *G06F 9/3816* (2013.01); *G06F 12/1081* (2013.01); *G06F 16/906* (2019.01); *G06F 3/0607* (2013.01)

(58) Field of Classification Search
None
See application file for complete search history.

(56) References Cited

U.S. PATENT DOCUMENTS

| 6,976,022 | B2 | 12/2005 | Vemuri et al. |
| 8,332,354 | B1 | 12/2012 | Chatterjee |
| 9,164,702 | B1* | 10/2015 | Nesbit ............... G06F 15/17331 |

(Continued)

FOREIGN PATENT DOCUMENTS

KR 2012/0009800 2/2012

OTHER PUBLICATIONS

Yu, Kai, "IOUG Collaborate 2015 conference paper: Leveraging Oracle ASM Cluster File System for Cloud Storage", dated Apr. 2016, 13 pages.

(Continued)

*Primary Examiner* — Stephanie Wu
(74) *Attorney, Agent, or Firm* — Hickman Becker Bingham Ledesma LLP

(57) ABSTRACT

Techniques are described for providing one or more clients with direct access to cached data blocks within a persistent memory cache on a storage server. In an embodiment, a storage server maintains a persistent memory cache comprising a plurality of cache lines, each of which represent an allocation unit of block-based storage. The storage server maintains an RDMA table that include a plurality of table entries, each of which maps a respective client to one or more cache lines and a remote access key. An RDMA access request to access a particular cache line is received from a storage server client. The storage server identifies access credentials for the client and determines whether the client has permission to perform the RDMA access on the particular cache line. Upon determining that the client has permissions, the cache line is accessed from the persistent memory cache and sent to the storage server client.

20 Claims, 7 Drawing Sheets

(56) References Cited

U.S. PATENT DOCUMENTS

| | | | |
|---|---|---|---|
| 9,471,586 | B2 | 10/2016 | Patil et al. |
| 9,563,521 | B2 | 2/2017 | Panteleenko et al. |
| 9,977,760 | B1* | 5/2018 | Diehl .................... G06F 16/13 |
| 10,599,630 | B2 | 3/2020 | Li |
| 10,732,836 | B2 | 8/2020 | Shi et al. |
| 11,061,884 | B2 | 7/2021 | Li |
| 2006/0085484 | A1 | 4/2006 | Raizman et al. |
| 2011/0040792 | A1 | 2/2011 | Perry |
| 2014/0047193 | A1* | 2/2014 | Gross ................. G06F 12/0893 711/144 |
| 2015/0169612 | A1 | 6/2015 | Kashyap |
| 2016/0162206 | A1 | 6/2016 | Bish et al. |
| 2016/0170895 | A1* | 6/2016 | Nakajima ............ G06F 9/5077 711/118 |
| 2017/0091246 | A1 | 3/2017 | Risvik |
| 2018/0121455 | A1 | 5/2018 | Eda et al. |
| 2020/0183794 | A1 | 6/2020 | Dwarampudi et al. |
| 2022/0004525 | A1 | 1/2022 | Graves et al. |

OTHER PUBLICATIONS

USENIX, "Proceedings of the FREENIX Track: 2003 USENIX Annual Technical Conference", dated Jun. 2003, 11 pages.

Petersen et al., "The Role of SSD Block Caches in a World of Networked Burst Buffers", dated 2018, 5 Pages.

Oracle Open World, "#OOW18", dated Oct. 2018, 34 pages.

Noronha et al., "Designing NFS With RDMA for Security, Performance and Scalability", Technical Report, dated Jun. 8, 2007, 22 pages.

Jayakumar et al., "A Simple Measuring Model for Evaluating the Performance of Small Block Size Accesses in Lustre File System", vol. 7, No. 6, dated 2017, 6 pages.

Gluster Community, "GlusterFS Documentation, Release 3.8.0", dated Aug. 10, 2018, 56 pages.

Gelbart et al. "Bayesian Optimization with Unknown Constraints", dated May 22, 2014, 10 pages.

Laitala, Joni, "Metadata Management in Distributed File Systems", University of Oulu,, dated Jun. 9, 2017, 20 pages.

Ragunathan et al., "Frequent Block Access Pattern-Based Replication Algorithm For Cloud Storage Systems", 2015 Eighth International Conference on Contemporary Computing, IEEE, dated Aug. 20, 2015, 6 pages.

Chen et al., "Collective Mining of Bayesian Networks from Distributed Heterogeneous Data", Knowledge and Information Systems, 2004, 24 pages.

"ReadWriteLock", available: tutorials.jenkov.com/java-util-concurrent/readwritelock.html, 2014, 5 pages.

"Basics of Hash Tables", available: https://www.hackerearth.com/practice/data-structures/hash-tables/basics-of-hash-tables/tutorial/, 2019, 11 pages.

Graves, U.S. Appl. No. 16/918,822, filed Jul. 1, 2020, Non-Final Rejection dated Oct. 25, 2022.

N-able.com, "3 Tips for Shrinking your RTOs and RPOs", https://www.n-able.com/blog/3-tips-for-shrinking-your-rtos-and-rpos, dated Apr. 9, 2015, 4 pages.

N-able, "Reducing RPO and RTO With N-able Backup", Apr. 3, 2019, available: https://www.n-able.com/fr/blog/rto-vs-rpo, 5 pages.

* cited by examiner

100

PMEM CACHE RDMA SECURITY

FIELD OF THE INVENTION

The present invention relates to managing access permissions for data, within a cache, belonging to multiple separate databases.

BACKGROUND

Computing elements, such as workstations and server blades, may request data blocks from other "source" computing elements over a network. The source computing elements may represent storage servers that provide remote computing elements with shared storage access. The source computing elements may use a persistent cache (e.g. cache in persistent memory) to cache copies of the data blocks that are primarily stored in primary persistent storage (e.g. disk storage).

Persistent caches are generally faster and smaller than primary storage. If a copy of a data block is stored in the persistent cache when a request for that data block is received, the data block can be returned far more quickly from the persistent cache than from primary storage.

In order to manage input/output (I/O) operations from remote computing elements, storage servers may use a message-based storage protocol. In some cases, the message-based storage protocols may use Remote Direct Memory Access (RDMA) to transfer data between computing elements. RDMA is a technology that allows the network interface controller (NIC) of the storage server to transfer data "directly" to or from memory of a remote computing element, that is, transferring the data to or from the memory without involving the central processing unit(s) (CPUs) on the remote computing element.

For example, a remote computing element issues a read request to the source computing element, the storage server. In response to the read request, the storage server uses a disk controller to perform a block-level read from disk and loads the data into its local memory. The storage server then performs an RDMA write to place the data directly into an application memory buffer of the remote computing element. Using RDMA increases data throughput, decreases the latency of data transfers, and reduces the load on the storage server and remote computing element's CPU during data transfers. Implementations of RDMA protocols may use a mapping table, such as a hash table to map data block on-disk locations to their respective locations in persistent cache. The storage server may use the mapping table to locate requested data blocks in the persistent cache using their on-disk location, provided by the remote computing element. However, security for the mapping table is implemented at a table level. That is, if the remote computing element is authorized to access the mapping table, then the remote computing element may access all records in the mapping table regardless if records are associated with another database within the same cluster as the remote computing element.

One approach to overcome this security issue is to implement security measures for each data block loaded into the persistent cache. By doing so, a remote computing element may only have access to data blocks that the remote computing element is authorized to access. However, the processing overhead of registering, deregistering, and managing security for each data block in the persistent cache is quite large. The CPU on the storage server would be adversely impacted by the additional overhead from memory registration/deregistration and message processing that overall performance of the storage server may be adversely impacted.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
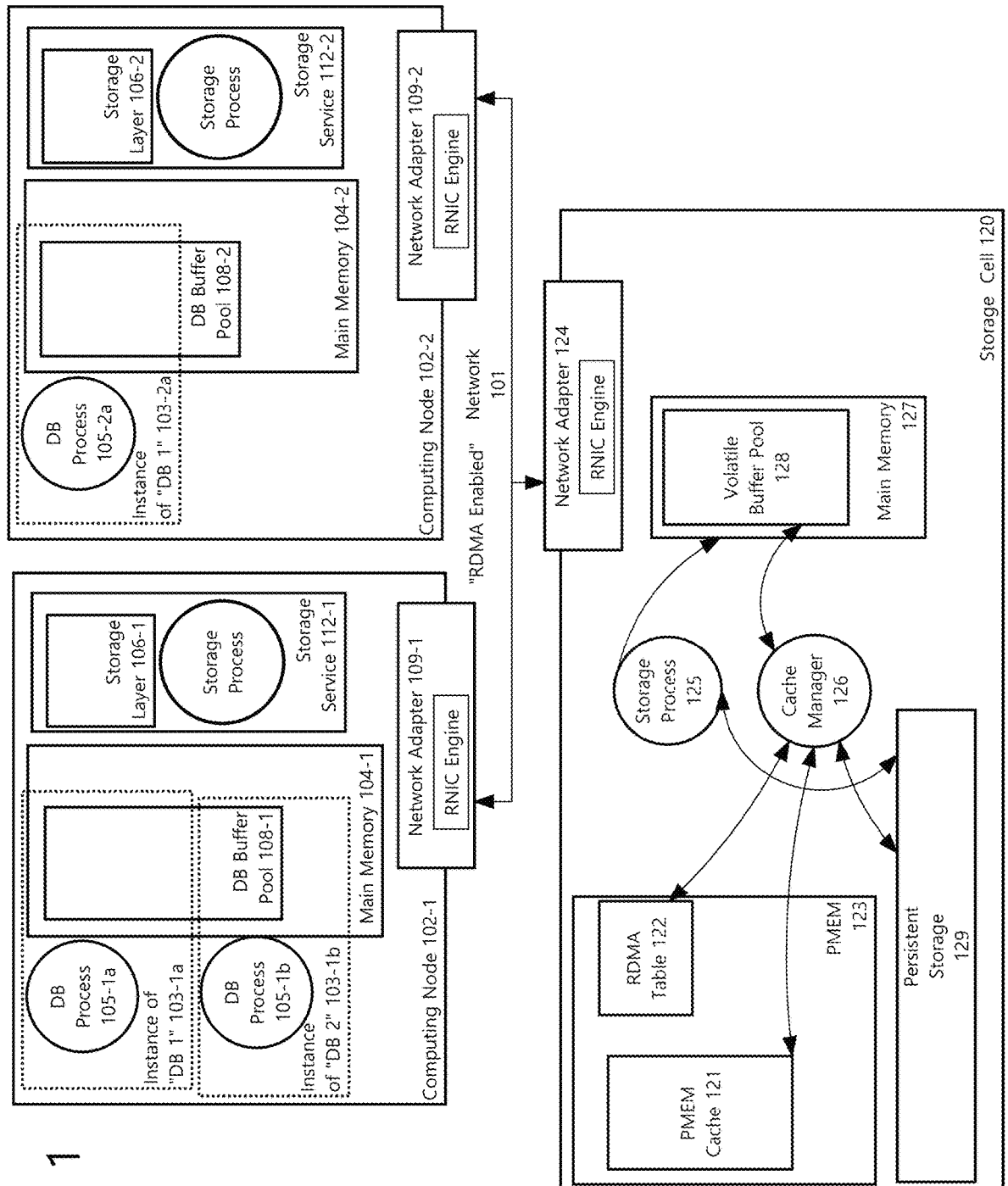
FIG. 1 is a block diagram that illustrates a multi-node DBMS, according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein are novel techniques for accessing data blocks over a network that are cached in a persistent cache. The techniques make use of a form of persistent byte addressable memory referred to as persistent memory (PMEM). Data blocks are cached in a pool of buffers allocated from PMEM, a pool of buffers allocated from PMEM being referred to herein as PMEM cache. Data blocks may be accessed from the PMEM cache by a remote computing element over a network using remote direct memory access (RDMA). Transmitting data blocks via RDMA avoids CPU overhead attendant to performing read staging in order to transmit data blocks over the network. These techniques are herein referred to as PMEM caching.

Under PMEM caching, in order for a remote computing element, such as a storage server client, to access one or more data blocks in the PMEM cache on a source computing element, such as storage server, the storage server client needs the memory address of the one or more data blocks within the PMEM cache. An RDMA table may be stored within the PMEM on the storage server. The RDMA table identifies the data blocks in the PMEM cache and specifies a location of the cached data blocks within the PMEM cache. The RDMA table is accessible by remote computing elements using RDMA. For example, the remote computing element can determine the existence and location of a data block within the PMEM cache through RDMA reads of the RDMA table.

In an embodiment, the RDMA table may contain a plurality of records, each record corresponding to one or more cache lines within the PMEM cache. A cache line represents a unit of data that contains one or more cached data blocks. Each record in the RDMA table represents a cache line in the PMEM cache. Each record contains mapping that maps remote access keys to: cache addresses for cached data blocks in the PMEM cache and their corresponding persistent storage address with the storage server. The storage server may allow access to cached data blocks upon receiving an RDMA access request from a storage server client. An RDMA access request, generated by the storage server client, may include a remote access key, which is associated with the target cache line to be accessed from the PMEM cache, and access credentials that are used by the storage server to determine whether the storage server client has permission to access the target cache line from the PMEM cache. In an embodiment, the remote key and the access credentials are used to determine whether the storage server client has valid permissions to access the target cache line. Both the access credentials and the remote key are needed to access data in the PMEM cache. The access credentials are used by the storage server to determine whether the storage server client has permissions to access a set of cache lines allocated to a particular client in the PMEM cache. The remote key is used by the storage server to locate a particular record in the RDMA table in order to identify the cache location of the target cache line in the PMEM cache.

In order for the storage server client to generate an RDMA access request, the storage server and the storage server client may establish a secure RDMA connection for communicating RDMA access requests and responses. Upon establishing the RDMA connection, the storage server sends RDMA connection information to the storage server client, which includes a copy of a portion of the RDMA table that contains records corresponding to cache lines currently assigned to the storage server client. Other portions of the RDMA table containing records that reference other cache lines assigned to other clients are not sent to this particular storage server client.

In an embodiment, the storage server may determine how to allocate cache lines to various storage server clients based upon prior data requests from storage server clients. For example, the storage server may determine that particular sets of data are being requested by the storage server client using non-RDMA access requests, and may then store the requested sets of data within the PMEM cache for subsequent requests using RDMA. Upon loading data for the storage server client into the PMEM cache, the storage server may send the copy of the portion of the RDMA table, which contains the records of cache lines assigned to the storage server client, to the storage server client. The copy of the portion of the RDMA table may be used by the storage server client to determine which data is stored in the PMEM cache and when to generate an RDMA access request.

When determining whether to generate an RDMA access request, the storage server client may analyze the local copy of the portion of the RDMA table to determine whether data to be requested, herein referred to as target data, is stored within the PMEM cache. For instance the storage server client may search for the target data, in the portion of the RDMA table, using the persistent storage address of the target data. If the target data is found within the local copy of the portion of the RDMA table, then the storage server client may identify the remote key that is mapped to the persistent storage address of the target data and generate an RDMA access request for the target data that includes the mapped remote key. The RDMA access request also includes the access credentials for the storage server client. In an embodiment, the access credentials for the storage server client may be derived from database and database cluster identifiers that the RDMA access request originated from.

The storage server may receive the RDMA access request from the storage server client and determine whether the storage server client has permissions to access the target data from the PMEM cache. The storage server determines whether the access credentials provided by the requesting storage server client match the access credentials associated with the cache line to be accessed. If the access credentials match, then the storage server determines whether the remote key from the RDMA access request identifies a particular cache line. If the remote key matches the particular cache line, then permission to access the cached data blocks in the PMEM cache is granted. If however, the access credentials provided by the requesting storage server client do not match the access credentials associated with the cache line to be accessed or the remote key provided in the RDMA access request does not correspond to the particular cache line, then the storage server client is not granted access to the cached data blocks.

Illustrative DBMS

PMEM caching is illustrated in the context of a DBMS. A DBMS comprises at least one database server. The database server is hosted on at least one computing element and stores database data in block mode storage devices. The block mode storage devices may be one or more disk drives and flash drives connected via a high speed bus of the computing element to the one or more hardware processors ("processors") of the computing element and/or memory of the computing element. A block mode storage device may also be a network enabled storage device that is connected via a network to the computing element and that compromises other block mode storage devices such as disk drives and flash drives.

More powerful DBMSs are hosted on a parallel processer hardware platform. Such DBMSs are referred to herein as multi-node DBMSs. A multi-node DBMS comprises multiple computing elements referred to herein as computing nodes. Each computing node comprises a hardware processor or multiple hardware processors that each shares access to the same main memory.

FIG. 1 is a block diagram that illustrates a multi-node DBMS, in an embodiment. The multi-node DBMS 100 comprises a database cluster with multiple computing nodes, each hosting one or more database server instances, and a storage cell implemented to provide remote storage for the one or more databases within the multi-node DBMS 100. Each database server instance for a particular database provides access to one or more databases stored on storage cell 120. The database server instances of DBMS 100 comprise database server instances 103-1a, 103-1b, and 103-2a. Database server instances 103-1a and 103-2a are hosted on computing nodes 102-1 and 102-2 respectively and manage access to a first database, referred to as DB1. Database server instance 103-1b, hosted on computing node 102-1, manages access to a second database referred to as DB2. Each of the databases DB1 and DB2 are within the same cluster, database cluster 1. Each of the database server instances 103-1a, 103-2a, and 103-1b are connected to the storage cell 120 by a high speed network 101. Database processes running within database server instances 103-1a, 103-2a, and 103-1b are storage device clients of storage cell 120. According to an embodiment, DB1 and DB2 are pluggable databases (PDBs) within a container database managed by a container DBMS. The container DBMS includes database server instances 103-1a, 103-2a, and 103-1b. Database server instances may host database sessions for any of PDBs within the container. In addition, database service processes, such as log writers, may be storage device clients. Container DBMS is described in "Isolated Hierarchical Runtime Environments for Multi-Tenant Databases", U.S. application Ser. No. 16/165,996, filed by Santosh Shilimkar, et al., on Oct. 19, 2018, the entire contents of which are incorporated herein by reference.

Storage cell 120 represents a source computing element, such as a storage server, that includes persistent storage (e.g. disk and PMEM) for storing "database files" of the one or more databases in the DBMS 100. Storage cell 120 includes persistent storage 129 and main memory 127. Persistent storage 129 may comprise persistent storage devices such as disk devices or flash memory devices. Main memory 127 represents volatile RAMS. Storage process 125 represents a process that receives requests from any of the database server instances 103-1a, 103-1b, and 103-2a to read or write data blocks to or from database files stored in persistent storage 129. Storage process 125 is further discussed in the STORAGE SERVICES section herein. Volatile buffer pool 128 is a buffer pool allocated from main memory 127. Volatile buffer pool 128 comprises buffers used for temporarily staging and/or caching of data blocks stored in persistent storage 129.

Storage cell 120 also includes non-volatile RAM memories PMEM 123. The PMEM 123 includes PMEM cache 121 and RDMA table 122. The PMEM cache 121 is a cache allocated from PMEM 123 and comprises buffers that are used for temporarily staging and/or caching data from persistent storage 129. Once data is added to the PMEM cache 121, it can be used to satisfy subsequent read requests for data. Eventually, cached data must be removed from the PMEM cache 121 to make room for other data. To select and remove data to make room for other data to be cached, various cache management policies and techniques may be used, such as Least Recently Used algorithms or any data caching policy. Cache manager 126 is a process responsible for performing cache management of the PMEM cache 121.

Database Server Instances

Each of the database server instances of DBMS 100 comprise database processes that run on the computing node that hosts the database server instance. A database process may be, without limitation, a process running within a database session that executes database commands issued within the database session or a query execution process belonging to a pool of processes that is assigned to execute queries issued through database sessions.

Referring to FIG. 1, each of database server instances 103-1a, 103-1b, and 103-2a comprise database processes and database buffers that cache data blocks read from storage cell 120. Database server instances 103-1a, 103-1b, and 103-2a are hosted on computing nodes 102-1 and 102-2. Database server instance 103-1a comprises DB processes 105-1a and database buffer pool 108-1, which is allocated from main memory 104-1. Database server instance 103-1b comprises DB processes 105-1b and database buffer pool 108-1. Database server instance 103-2a, hosted on computing node 102-2, comprises DB process 105-2a and database buffer pool 108-2, which is allocated from main memory 104-2. Each of the database server instances 103-1a, 103-1b, and 103-2a may include additional DB processes (not shown).

RDMA

Network adapters 109-1, 109-2, and 124 connect computing nodes 102-1, 102-2 and storage cell 120, respectively, to network 101. Network adapters 109-1, 109-2, and 124 may comprise any type of network adapter that supports RDMA operations, which are herein referred to as RDMA-enabled network interface controller (RNICs). Example RNICs include, without limitation, InfiniBand host channel adapters (HCAs). Network adapters 109-1, 109-2, and 124 implement the RDMA protocol (RDMAP) above a reliable transport. Thus, network adapters 109-1, 109-2, and 124 may support protocols including, without limitation, RDMA over converged Ethernet (RoCE), the Internet Wide Area RDMA Protocol (iWarp), and the Infiniband protocol.

Network adapters 109-1, 109-2, and 124 may be associated with an RNIC interface (RI), where the RI is the presentation of the RNIC to a consumer as implemented through the combination of the RNIC device and an RNIC device driver. An RNIC device driver represents a computer program configured to translate commands between the operating system and the computing language used by the RNIC device. A consumer, as used herein may be any computer system process, such as application processes and operating system kernels, that communicate with the RNIC through the RI. Examples of computer system processes that communicate with the RNIC using RI include storage services 112-1, 112-2, and storage process 125. The RI may be implemented as a combination of hardware, firmware, and software. A kernel may expose some or all of the RI functionality to application processes through one or more Application Programming Interfaces (APIs).

Processing performed by network adapters 109-1, 109-2, and 124 may be performed by an RNIC engine. The RNIC engine offloads the processing of RDMA messages from CPUs on computing nodes 102-1, 102-2, and storage cell 120 onto their respective network adapters 109-1, 109-2, and 124. The implementation of the RNIC engine may vary from implementation to implementation. For example, the RNIC engine may be included in an integrated circuit or some other hardware on a network adapter card. In another embodiment, the network adapters may include special purpose processors with a limited instruction set for processing RDMA messages and performing direct memory accesses.

RNIC engines, implemented by network adapters 109-1, 109-2, and 124, may establish connection queues between each other for the purpose of sending RDMA access requests and receiving result sets of data corresponding to the RDMA access requests. For example, InfinitiBand protocol uses a queue pair comprising a send queue and a receive queue for the purposes of transferring data between client computing nodes and storage cells. The send queue may be used to send data requests from computing node 102-1 to storage cell 120, while the receive queue may be used, by the computing node 102-1, to receive the requested data from the storage cell 120. In an embodiment, the queue pairs, once established, remain open and may be used for subsequent RDMA access requests until the queue pair is terminated by either the computing node 102-1 or the storage cell 120. Queue pairs may be terminated if a request for data is not authorized. For example, if a client on computing node 102-1 requests data from PMEM cache 121, where the requested data is not authorized for access by the client on 102-1, then the storage cell 120 may deny the request by terminating the open queue pair between computing node 102-1 and storage cell 120. By terminating the queue pair, the storage cell 120 may ensure that future unauthorized requests are not received by the client.

RDMA Table

In an embodiment, RDMA table 122 stores records of data cached in the PMEM cache 121. The records in the RDMA table 122 specify the memory address of the cached data in persistent storage 129, the cache memory address of the cached data, and a remote key assigned to the specific clients for the cached data. The RDMA table 122 may be an RDMA hash table. In an embodiment, storage cell 120 stores the RDMA table 122 in PMEM 123. Optionally, the storage cell 120 may store a copy of the RDMA table 122 in the volatile buffer pool 128, which may be used by the storage process 125 for reads and updates. The RDMA table 122 contains references to sets of cached data blocks stored in the PMEM cache 121 and specifies the storage location within the PMEM cache 121 ("cache location") of each cached data block in the PMEM cache 121. A cache location may refer to a memory address of a buffer within the PMEM cache 121 or an offset from a base memory address of the PMEM cache 121. The base memory address of a data structure is the memory address of the beginning of the region of memory at which a data structure is stored.

Data stored in the PMEM cache 121 are accessed and stored in terms of cache lines. A cache line is a unit of data transferred between volatile buffer pool 128 or persistent storage 129 to the PMEM cache 121. In an embodiment, a cache line represents 64 KB of memory. In other embodiments, cache lines may represent larger or smaller sizes. If a client wants to read a target data block, within a particular cache line, the client will then request to read the entire cache line in order to identify and read the target data block. In an embodiment, an extent represents a memory region, within the PMEM cache 121, allocated to a specific client. An extent represents an allocation unit of one or more contiguous cache lines. For example, extents may represent 2 MBs (32 cache lines) of contiguous space within the PMEM cache 121. In an embodiment, the size of extents within the cache, are uniform, that is, only one extent size may be configured for the PMEM cache 121. One or more extents may be allocated to a client at a given time. In yet other embodiments, differently sized extents, within the cache, may be configured for the PMEM cache 121.

A protection domain is used to identify a group of one or more extents that have similar security requirements for a first client, where the first client may represent one or more instances of a DB or multiple PDBs within a cluster. For instance, the protection domain may be represented by a first protection domain identifier. The first protection domain identifier may be assigned to the first client and may be used by the first client to access cache lines, within the one or more extents, that the first client has privileges to access. Other cache lines, within the PMEM cache 121, that are not part of the one or more extents assigned to the first protection domain identifier of the first client are not accessible, nor viewable, by the first client. That is, the first client, using the assigned first protection domain identifier, is only aware of the cache lines associated with the first protection domain identifier. A second client, assigned to a second protection domain identifier, may only view and access cache lines that are associated with the second protection domain identifier. Cache lines associated with either the first protection domain identifier or another protection domain identifier are not accessible by the second client.

Figure 2A:
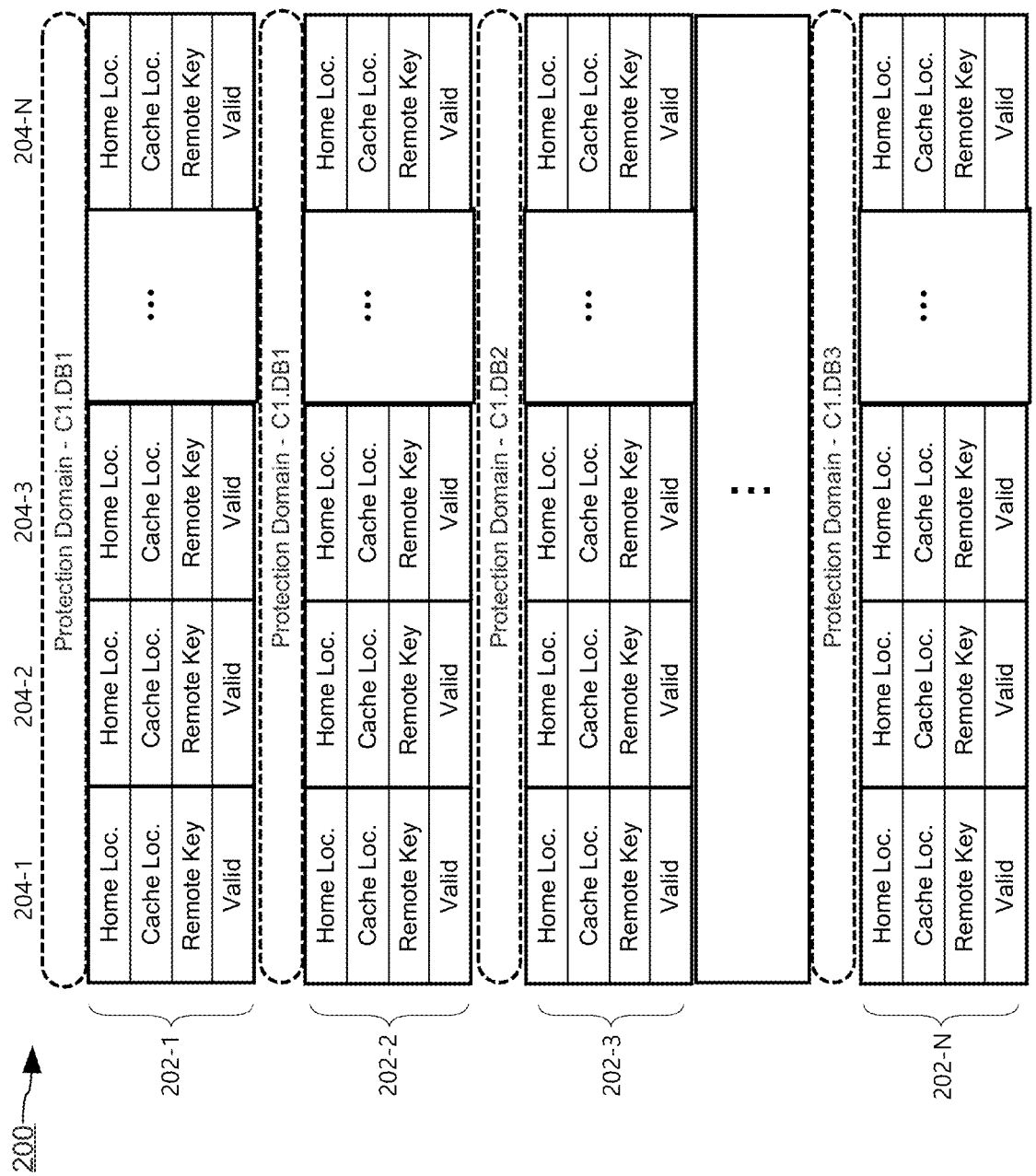
FIG. 2A illustrates the structure of an RDMA table, according to an embodiment of the present invention.

FIG. 2A illustrates the structure of the RDMA table 122 according to an embodiment of the present invention. Referring to FIG. 2A, RDMA table 122 includes records 202-1, 202-2, 202-3 through 202-N that reference cache lines stored in the PMEM cache 121. According to an embodiment, each cache line comprises an array of elements that are stored contiguously (within a memory address space) of PMEM cache 121. Each of the records in the RDMA table 122 contain an array of elements referencing the elements in the corresponding cache lines. For example, record 202-1 comprises elements 204-1, 204-2, 204-3 through 204-N. Each element corresponds to a cached data block cached in PMEM cache 121 and includes at least the following attributes:

Home Location: Specifies the Home Location of the corresponding cached data block. The term "home location" refers to the storage location of a data block in persistent storage and not to the storage location or address within the PMEM cache 121 or other buffer pool that is used to temporarily cache data blocks from the persistent storage.

Cache Location: Storage Location of the cached data block in the PMEM cache 121.

Remote Key: Is an access identifier generated when the storage cell 120 registers a specific memory region, of one or more extents, to a particular protection domain. The remote key is passed to the client associated with the particular protection domain and is used by the client to locate and access the specific memory region associated with the particular protection domain. For example, if a client on computing node 102-1 is assigned the particular protection domain, then storage process 125 would provide the remote key to the client on computing node 102-1 and the client may access the corresponding memory region from the RDMA table 122 using RDMA operations generated and sent to storage cell 120 by the RNIC on network adapter 109-1.

Valid Flag: A flag that indicates whether or not the information in the element is valid or invalid. When valid, the information is accurate and may be relied upon for a period of time referred to as an expiration period.

Records 202-1, 202-2, 202-3 through 202-N in the RDMA table 122 are illustrated with their associated protection domains however, the protection domains are not part of the physical records within the RDMA table 122. The protection domains shown in RDMA table 122 are used to illustrate which cache lines are associated with which protection domains. For example, protection domain identifier C1.DB1 is associated with cache lines 202-1 and 202-2. Protection domain identifier C1.DB2 is associated with cache line 202-3. Protection domain identifier C1.DB3 is associated with cache line 202-N. If client A is assigned the protection domain identifier C1.DB1 then client A, once an RDMA connection between client A and storage cell 120 is established, may access the RDMA table 122. Client A's access of the RDMA table 122 would only include access to the cache lines represented by records 202-1 and 202-2. The remaining cache lines represented by records 202-3 and 202-N would not be accessible by client A as client A's protection domain identifier (C1.DB1) is only associated with the cache lines represented by records 202-1 and 202-2. Similarly, if client B is assigned the protection domain identifier C1.DB2, then client B's access to the RDMA table 122 would only allow client B to access the cache line represented by record 202-3.

In an embodiment, storage cell 120 provides copies of portions of the RDMA table 122 to storage server clients so that the storage server clients may look up remote key values that are associated with particular cache lines for the purposes of generating RDMA access requests. Specifically, the storage cell 120 sends a set of records from the RDMA table 122 that correspond to a particular protection domain identifier assigned to a particular storage server client. For example, if client A is assigned to protection domain identifier C1.DB1 then client A would be sent a copy of the set of records corresponding to cache lines 202-1 and 202-2, which are associated with the C1.DB1 protection domain identifier, by the storage cell 120.

Storage server clients may use stored local copies of the portions of the RDMA table 122 to generate RDMA access requests and send the generated requests to the storage cell 120 using the RDMA connection queues. For example, upon receiving a copy of the portion of the RDMA table 122, client A, which has an instance of DB1 of cluster 1 running, may store the copy of the portion of the RDMA table 122 in main memory 104-1. Client A, when seeking to retrieve data ("target data") stored in the storage cell 120, may reference a data dictionary, stored in main memory 104-1, to determine the home location of the target data. Client A may then scan the local copy of the portion of the RDMA table 122 using the home location of the target data to determine whether the target data is currently loaded in the PMEM cache 121 in storage cell 120. If client A determines that a record in the portion of the RDMA table 122 corresponds to the home location of the target data, then the target data is in the PMEM cache 121 and client A may retrieve the remote key assigned to the target data from the record in the portion of the RDMA table 122. Client A may use the remote key associated with the record of the target data to generate an RDMA access request. If however, the target data is not in the local copy of the portion of the RDMA table 122, then the target data is not currently loaded in the PMEM 121 and client A would have to generate and send a non-RDMA access request to the storage cell 120.

Cache Groups

Figure 2B:
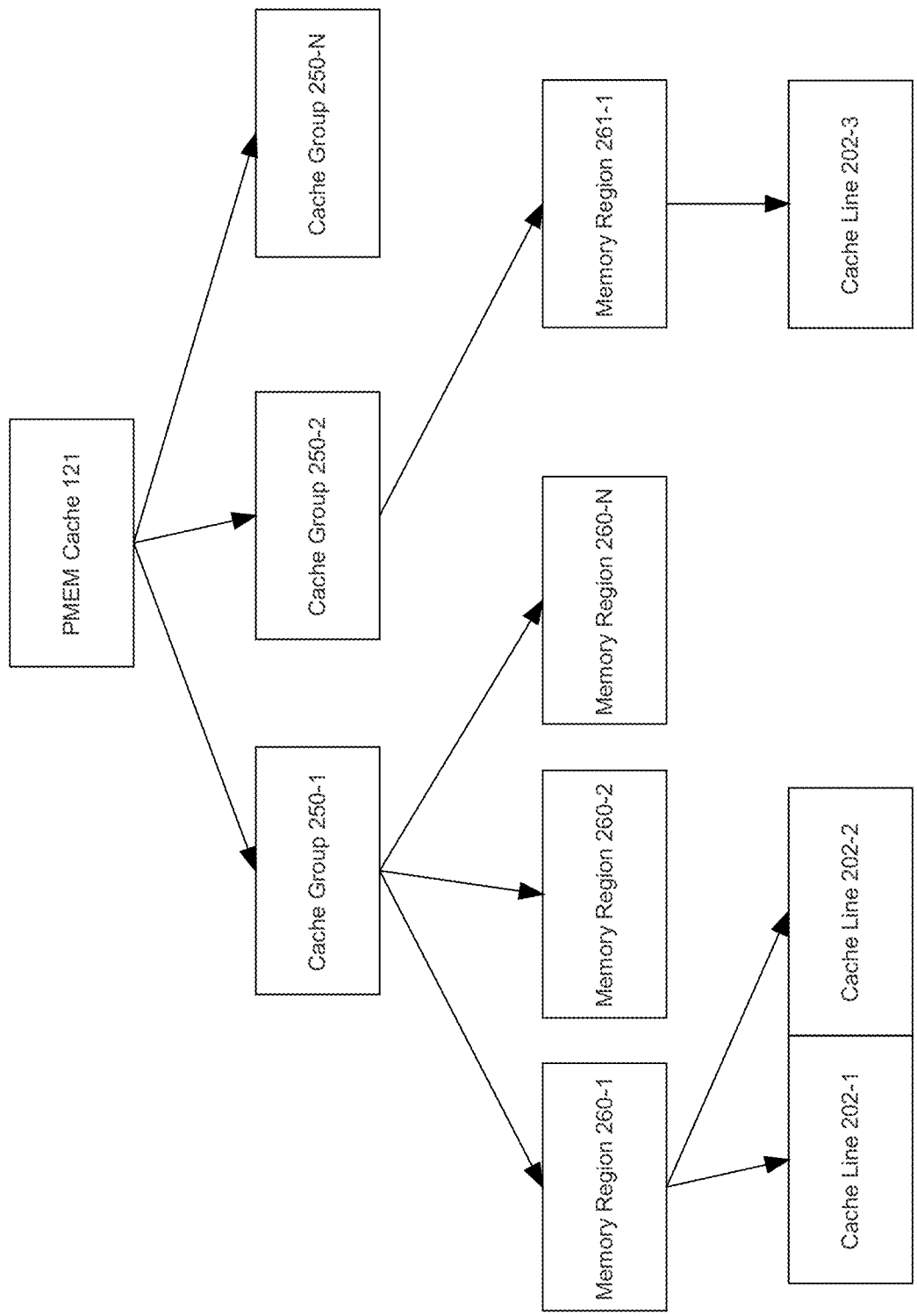
FIG. 2B illustrates a logical hierarchy between cache groups, memory regions, and cache lines within a persistent memory (PMEM) cache, according to an embodiment of the present invention.

A cache group represents a logical grouping of memory regions of cache lines in the PMEM cache 121 that have been assigned to a particular client. FIG. 2B illustrates a logical hierarchy between cache groups, memory regions, and cache lines within the PMEM cache 121. In an embodiment, PMEM cache 121 may contain cache lines assigned to multiple different cache groups. A cache group may represent one or more specific clients, where a client may be defined as one or more database processes accessing a particular database in a specific database cluster. For example, computing node 102-1 may include multiple cache groups representing multiple clients since computing node 102-1 hosts database cluster 1 that includes DB1 and DB2. Cache group 250-1 represents a first cache group that includes database processes running within database sessions for DB1 from database cluster 1 and cache group 250-2 represents a second cache group that includes database processes running within database sessions for DB2 from database cluster 1.

Cache groups may be associated with an identifier, referred to as a protection domain. In an embodiment, protection domains are values derived from a database cluster identifier and a database identifier. For example, the protection domain for cache group 250-1 is C1.DB1, where C1 represents the cluster identifier and DB1 represents the database identifier for database 1 in cluster 1. The protection domain for cache group 250-2 is C1.DB2, where C1 represents the cluster identifier and DB2 represents the database identifier for database 2 in cluster 1.

In an embodiment, each cache group may be assigned one or more memory regions. For example, memory region 260-1, 260-2, and 260-N represent memory regions assigned to cache group 250-1. Each memory region contains a set of contiguous cache lines. For example, cache lines corresponding to records 202-1 and 202-2 represent contiguous cache lines within memory region 260-1.

In an embodiment, cache lines within memory regions assigned to a particular cache group are only accessible and visible to the particular client represented by the particular cache group. For example, records 202-1 and 202-2 belong to cache group 250-1 and record 202-3 is assigned to cache group 250-2. A client represented by cache group 250-1 can only view records in RDMA table 122 assigned to cache group 250-1, which includes records 202-1 and 202-2. A client represented by cache group 250-2 can only view records in RDMA table 122 assigned to cache group 250-2, which includes record 202-3. Referring to FIG. 2B, cache group 250-2 contains the assigned memory region 261-1, which contains the cache line corresponding to record 202-3.

In some embodiments, multiple databases within a cluster may be assigned to a single cache group. This may occur when particular databases within a cluster do not have a specific cache management policies and have the same level of security between them. For example, multiple databases within the cluster may share database information, such as sharing database tables, such that security between the multiple databases does not require exclusive access to data in cache lines associated with each of the multiple databases within the cluster. As a result, a cache group that represents multiple databases within a cluster may be assigned a single protection domain to represent the multiple databases within the cluster. For example, cache group 250-N may represent a group of databases that share cache lines within the PMEM cache 121. The cache group 250-N may be identified with protection domain, C1.DB0, which represents the multiple databases within cluster 1 that have the same access privileges to specific data.

In an embodiment, storage process 125, on storage cell 120, is implemented to allocate memory regions in the PMEM cache 121 to clients by assigning a protection domain to a requesting client and allocating one or more memory regions to the requesting client. A protection domain has a one-to-one relationship to a cache group, such that each cache group is mapped to a single protection domain identifier. For example, storage process 125 may receive a request, from computing node 102-1, for data stored in the storage cell 120. Storage process 125 may determine whether that the requested data should be loaded into the PMEM cache 121. By loading the requested data into the PMEM cache 121, subsequent data requests from the client may be requested using an RDMA access request, thereby bypassing involvement of the CPU on the storage cell 120. Upon determining that the requested data may be loaded into the PMEM cache 121, the storage process 125 may register the client by assigning a protection domain identifier to the client. The protection domain identifier may be based on the requesting client's cluster ID and database ID. The generated protection domain identifier is then stored within a cache group data structure, which may be a table or other object, configured to keep track of clients, cache groups, and their corresponding protection domain identifiers. The storage process 125 allocates a memory region for the requesting client by communicating with the cache manager 126 to determine an available set of contiguous cache lines in the PMEM cache 121 that may be assigned to the requesting client, where the available set of contiguous cache lines would make up a new memory region. Once the new memory region has been identified, the storage process 125 may update the RDMA table 122 to reflect the allocation of the memory region to the requesting client. The storage process 125 may then load the requested data for the requesting client into one or more of the newly allocated cache lines of the new memory region in the PMEM cache 121.

The storage process 125 may then send the requesting client the requested data, RDMA connection information that includes the address for the RDMA table 122, a copy of a portion of the RDMA table 122 that includes the records assigned to the requesting client. The records within the portion of the RDMA table 122 include remote keys for remotely accessing the RDMA table 122 and any other information needed by the client to generate and send subsequent data requests using RDMA. For example, if storage process 125 allocated a memory region containing cache lines represented by records 202-1 and 202-2 to the client represented by cache group 250-1, then storage process 125 would send information containing the address for the RDMA table 122 and a copy of a portion of the RDMA table 122, that contains the records 202-1 and 202-2, to the client. Once an RDMA connection between the client and storage cell 120 is established, the client may access the cache lines in the PMEM cache 121 by generating RDMA access requests that include the remote keys corresponding to the records in the copy of the portion of the RDMA table 122 provided to the client. The client's access to cache lines in the PMEM cache would only be limited to cache lines corresponding to records 202-1 and 202-2, as these are the only records assigned to the client based on the associated protection domain identifier. RDMA access requests generated by the client may also include the associated protection domain identifier. The associated protection domain identifier is not included in the copy of the portion of the RDMA table 122 that is stored on the client but, is instead derived by the client based upon the client's DB identifier and database cluster identifier. For example, if the client represents database DB1 within cluster C1, then the client, when generating the RDMA access request, may generate the protection domain identifier as "C1.DB1".

Cache Management Policy

Each cache group has its own cache management policy that specifies how data within their allocated memory regions are managed. For example, a cache group policy may specify a maximum total cache size of 10 gigabytes for the memory regions assigned to a particular client. If a request is received, by the particular client, to load additional data into the PMEM cache 121, which is above the maximum size cap, then the cache manager 126 may reuse existing cache lines to load the requested data. Reuse of cache lines refers to invalidating existing data within one or more cache lines, for the particular client, and overwriting the existing data with the requested data.

In an embodiment, the cache manager 126 is implemented to manage and enforce cache management policies for the cache groups. The cache manager 126 determines when to remove data from the PMEM cache 121 in order to load newly requested data based upon the cache management policies associated with each cache group. In an embodiment, each cache group has its own cache group policy that defines rules for cache line management. Cache group policies may define when data in cache lines are to be reused so that new data may be loaded into the cache lines. In an embodiment, the cache management policies may specify whether a particular cache group has a minimum size requirement, a maximum size requirement, or a variable size requirement. A minimum size requirement specifies a minimum size of allocated memory regions that are assigned to a cache group at any particular time. For example, cache group 250-1 may have a minimum size requirement of 5 gigabytes which means that at any given time, cache group 250-1 should have memory regions within PMEM cache 121 that at least equal a size of 5 GB. This may be necessary if the client for cache group 250-1 has certain service-level agreements (SLAs) that require a minimum amount of PMEM cache 121 storage in order to meet response demand.

Storage Services

To initiate a data block read operation for a data block from a block enabled storage device, a database process running within a database server instance needs to determine the home location of the data block within the persistent storage 129 of the storage cell 120, such as the block address within a flash memory or a disk offset on a particular disk. To make this determination, a DBMS maintains mapping data within a data dictionary that specifies which database files hold data blocks for which database tables, and uses a storage service that maps database files and offsets within the database files to home locations in persistent storage. Each database server instance of DBMS 100 may store a copy of the mapping data within volatile RAM for quick access.

In an embodiment, each computing node of DBMS 100 hosts a storage service. Referring to FIG. 1, computing node 102-1 hosts storage service 112-1. Storage service 112-1 comprises one or more storage processes and storage layer 106-1. Similarly, computing node 102-2 hosts storage service 112-2, which comprises one or more storage processes and storage layer 106-2. A storage layer includes software and associated storage metadata that describes how database files are stored on various storage devices, such as disks and other persistent memory. The storage layer software is executed by storage processes within storage services 112-1 and 112-2.

In order for a process on computing node 102-1 and/or 102-2 to send RDMA access requests, the process needs information about the RDMA table 122, such as the storage location of the table, as well as RDMA connection queue information, such as queue pair information describing active queues between the computing node and the storage cell 120. Such information, once obtained, is stored in a dedicated area of main memory 104-1 and 104-2. For example, table configuration data may be stored in main memory 104-1 of computing node 102-1. Table configuration data contains information about RDMA table 122. Among the information contained in table configuration data is the base memory address of RDMA table 122, the memory size of the cache lines, as well as a local copy of a portion of the RDMA table 122 containing records of cache lines assigned to a client. For example, if the client represents DB1 in cluster 1 (protection domain C1.DB1), then the local copy of the portion of the RDMA table 122 would only include records corresponding to cache lines assigned to DB1 in cluster 1.

The table configuration data may be provided, by the storage cell 120, to computing node 102-1 and 102-2 upon establishing an RDMA connection with storage cell 120. In an embodiment, storage process 125 may receive non-RDMA access requests and, in response, may establish an RDMA connection with computing node 102-1 for receiving subsequent data access requests via RDMA. For example, storage process 125, upon processing a data access request, may determine that the requested data should be loaded into the PMEM cache 121. The storage process 125 may load the requested data into the PMEM cache 121, establish RDMA connection queues between the storage cell 120 and the computing node 102-1, and then provide the requested data to the computing node 102-1 along with the table configuration data for the RDMA table 122 and the RDMA connection information. Additional detail for processing non-RDMA requests is described in the NON-RDMA ACCESS REQUEST section herein.

If the table configuration data for the RDMA table 122 already exists in main memory 104-1 and an active RDMA connection exists for computing node 102-1, then the storage service 112-1 may generate an RDMA access request, provided that the requested data is in the PMEM cache 121. As described, the table configuration data includes a local copy of a portion of the RDMA table 122 corresponding to the cache group to which the client belongs. For instance, if the client is associated with cache group 250-1 (protection domain identifier C1.DB1), then the local copy of the RDMA table 122 would contain records for all cache lines assigned to C1.DB1, which includes records 202-1 and 202-2. In an embodiment, the storage service 112-1 may determine whether the requested data is in the PMEM cache 121 by determining whether there is a cache hit by scanning the local copy of the RDMA table 122. If there is a cache hit, then the storage service 112-1 may generate an RDMA access request and send the RDMA access request to the storage cell 120 using the RDMA connection queues. If however, there is not a cache hit on the local copy of the RDMA table 122, then the storage service 112-1 may generate a non-RDMA access request, and send the non-RDMA access request to the storage process 125 on the storage cell 120.

For example, DB process 105-1a, representing cluster 1 DB1, may request data from storage cell 120 by sending a request to storage service 112-1. Storage service 112-1 may receive the request from the DB process 105-1a and may convert the request into either an RDMA access request or a non-RDMA access request, depending upon whether an RDMA connection has been established and whether the request data is already stored in the PMEM cache 121.

Non-RDMA Access Requests

In an embodiment, a non-RDMA request represents a data access request sent via the network 101 and received by the storage process 125 on storage cell 120. Non-RDMA requests may be generated when there is no active RDMA connection between computing node 102-1 and storage cell 120.

Figure 3:
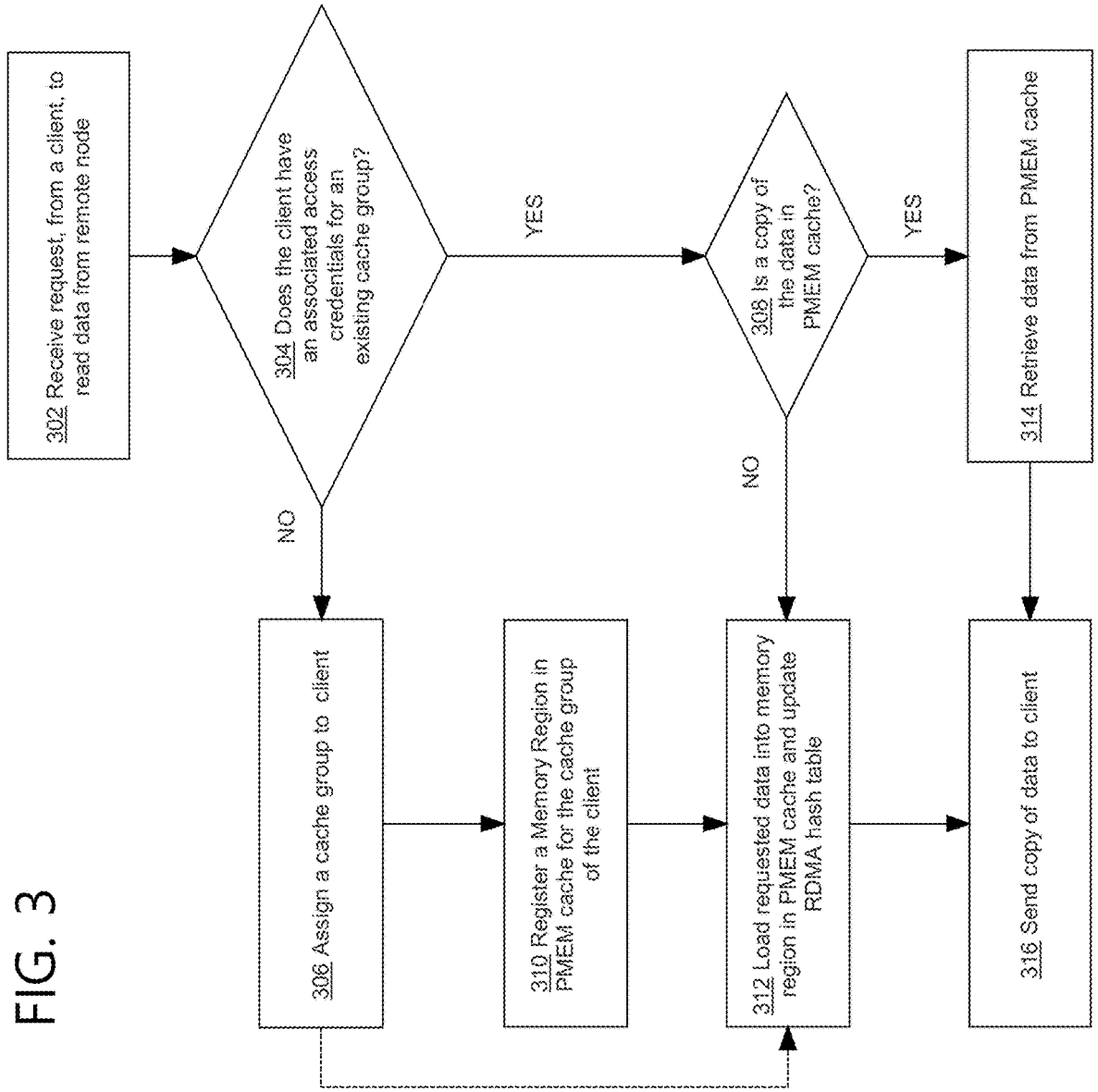
FIG. 3 is a flow chart depicting operations performed upon receiving a non-RDMA access request from a client, according to an embodiment of the present invention.

FIG. 3 is a flow chart depicting operations performed upon receiving a non-RDMA access request, according to an embodiment. Receiving a non-RDMA access request operation is illustrated using DB process 105-1a on computing node 102-1 and storage process 125 on storage cell 120. DB process 105-1a may initiate a read or write operation to either read a data block or write to a data block. Storage service 112-1 may receive a request from DB process 105-1a and determine the home location for the data block. Once the home location for the data block is determined, storage service 112-1 may determine whether the requested data may be accessed using an RDMA access request. As described, in order for an RDMA access request to be issued, an active RDMA connection needs to be available between computing node 102-1 and storage cell 120 and the requested data needs to be available in the PMEM cache 121. The storage service 112-1 may check whether an active RDMA connection exists by checking the table configuration information stored in main memory 104-1. If an active RDMA connection exists then the storage service 112-1 may scan a local copy of the RDMA table 122, stored in the main memory 104-1, to determine whether there is a cache hit for the requested data. If there is a cache hit, then that means the requested data has been loaded in the PMEM cache 121 and the storage service 112-1 may generate an RDMA access request for the requested data. If however, there is no cache hit for the requested data in the local copy of the RDMA table 122, then that means the requested data is not currently stored in the PMEM cache 121, and the storage process 125 may generate a non-RDMA access request and send the non-RDMA access request to the storage process 125.

Operations described in FIG. 3 are described in the context of a read request however, the operations may also apply to a request to write data to a data block. At block 302, a request, from a client, to read data from a remote node is received. In an embodiment, the storage process 125 receives a request to read data from a data block stored in persistent storage 129 of the storage cell 120. For example, DB process 105-1a may have initiated a data read request for a data block stored within persistent storage 129. The storage service 112-1 on computing node 102-1 may have received the request and generated a non-RDMA access request for the requested data. The non-RDMA access request may include, information identifying the requesting database and process, such as identifying that DB process 105-1a of instance 103-1a is requesting to read data for DB1 in cluster 1. The requested data may be identified using its "home location" corresponding to the storage location of the requested data in persistent storage 129.

At decision diamond 304, it is determined whether the client is associated with existing access credentials of an existing cache group. In an embodiment, storage process 125 determines whether the client is associated with an existing protection domain for an existing cache group by searching the cache group data structure that maintains clients, cache groups, and their associated protection domain identifiers. For example, the cache group data structure may be a table, which the storage process 125 queries using the cluster ID and database ID of the client. If the client is not listed in the cache group data structure table, then the storage process 125 may proceed to block 306 to assign a cache group to the client. If however, the client is listed in the cache group data structure table, then that means the client is associated with a cache group that may have assigned cache lines in the PMEM cache 121. In this scenario, the storage process 125 proceeds to decision diamond 308 to determine whether a copy of the data is stored within the PMEM cache 121.

At block 306, a cache group is assigned to the client. In an embodiment, if the client is not listed in the cache group data structure table, then the storage process 125 assigns a cache group to the client based on which cluster and database the client represents. For example, if the request originates from DB process 105-1a, which is a DB process for DB1 in cluster 1, then the storage process 125 may generate a new cache group for the client and assign the client a protection domain identifier that is derived from the cluster and database of the client, such as C1.DBA. The protection domain identifier represents an identifier for the cache group. The storage process 125 may insert a record into the cache group data structure table that includes the new cache group and the cluster and database identifiers for the client. In other embodiments, the protection domain identifier may be derived from the cluster and database identifiers but may be represented as a numeric value, alpha numeric value, or a hash value computed from the cluster and database identifiers.

In an embodiment, if the client represents a database within a cluster that shares content with other databases within the cluster and does not specify a separate cache management policy, then the storage process 125 may add the client to an existing cache group, where the existing cache group represents clients within the same cluster that share the same level of security between them. For example, if the client represents DB1 in cluster 1 and an existing cache group contains DB2 in cluster 1, where both DB1 and DB2 share common tables and have the same level of security and implement a default cache management policy, then the storage process 125 may add the client (DB1) to the cache group that contains DB2. The storage process 125 may insert a new record into the cache group data structure table that includes the existing cache group and the cluster and database identifiers for the client, such as cluster 1 and DB1.

Upon assigning a cache group to the client, the storage process 125 registers a memory region of cache lines in the PMEM cache 121 to the new cache group of the client. At block 310, a memory region in the PMEM cache 121 is assigned to the new cache group of the client. In an embodiment, the storage process 125 registers a new memory region to the new cache group by identifying a free memory region in the PMEM cache 121. The storage process 125 may request from the cache manager 126 a free memory region of cache lines to assign to the new cache group. The cache manager 126 may allocate previously unallocated contiguous cache lines to be a new memory region in the PMEM cache 121. Alternatively, if there are no unallocated cache lines in the PMEM cache 121, then the cache manager 126 may identify a set of allocated cache lines that may be reassigned based upon the respective cache management policies of other cache groups. The cache manager 126 may use an LRU algorithm to identify a contiguous set of cache lines currently allocated to a cache group that has a cache management policy that allows for reassignment of cache lines to another cache group.

In an embodiment, (shown by the dashed arrow from block 306 to block 312) the client was assigned to an existing cache group (at block 306), the storage process 125 may proceed directly to block 312 to load the requested data into a memory region of cache lines, provided that the existing cache group has available cache lines already allocated. For example, if the existing cache group had a memory region of cache lines that was only 50% utilized, then the storage process 125 may simply load the requested data into the free cache lines without the need of registering a new memory region to the existing cache line.

At block 312, the requested data is loaded into cache lines in a memory region of the PMEM cache 121. In an embodiment, the storage process 125 may use the provided home location of the requested data, from the initial request, to find the data in persistent storage 129 and load the data into the PMEM cache 121 using the cache locations specified by the free memory region allocated to the cache group of the client. In an embodiment, upon loading the requested data into cache lines in the PMEM cache 121, the storage process 125 updates the records in the RDMA table 122 to reflect the loading of the requested data into specific cache lines in the PMEM cache 121. Additionally, the storage process 125 may also load the requested data into the volatile buffer pool 128, such that it may be directly delivered to the client.

Referring back to decision diamond 304, if the storage process 125 determines that the client is already associated with a cache group, then the storage process 125 may proceed to decision diamond 308. At decision diamond 308, it is determined whether a copy of the requested data currently exists in the PMEM cache 121. In an embodiment, the storage process 125 queries the RDMA table 122 for the requested data using the home location of the requested data and the protection domain of the client to authenticate access for the client. If a copy of the requested data is in the PMEM cache 121, then the RDMA table 122 would contain a record indicating the cache location of the requested data in the PMEM cache 121. Upon determining that a record in the RDMA table 122 exists for the requested data, the storage process 125 proceeds to block 314 to retrieve a copy of the data from the PMEM cache 121. If however, the RDMA table 122 does not contain a record indicating that a copy of the requested data exists in the PMEM cache 121, then the storage process 125 proceeds to block 312 to load the requested data into the PMEM cache 121.

At block 314, a copy of the requested data is retrieved from the PMEM cache 121. In an embodiment, the storage process 125, upon determining that a record in the RDMA table 122 exists, identifies the cache location of the requested data from the RDMA table 122 and uses the cache location to retrieve the copy of the data from the PMEM cache 121.

At block 316, the copy of the data is sent to the client. In an embodiment, the storage process 125 generates and sends a message containing the copy of the requested data to the requesting client. The storage service 112-1 on the computing node 102-1 may receive the message, store the copy of the data within the database buffer pool 108-1, and provide the local address of the copy of the requested data to the DB process 105-1*a*. In an embodiment, the message sent to the computing node 102-1 by the storage process 125 may also contain table configuration information and RDMA connection information to the computing node 102-1, such that subsequent requests for data may be made using an RDMA access request. The table configuration information may include the RDMA table 122 address location and a local copy of the records in the RDMA table assigned to the client.

RDMA Access Request

Figure 4:
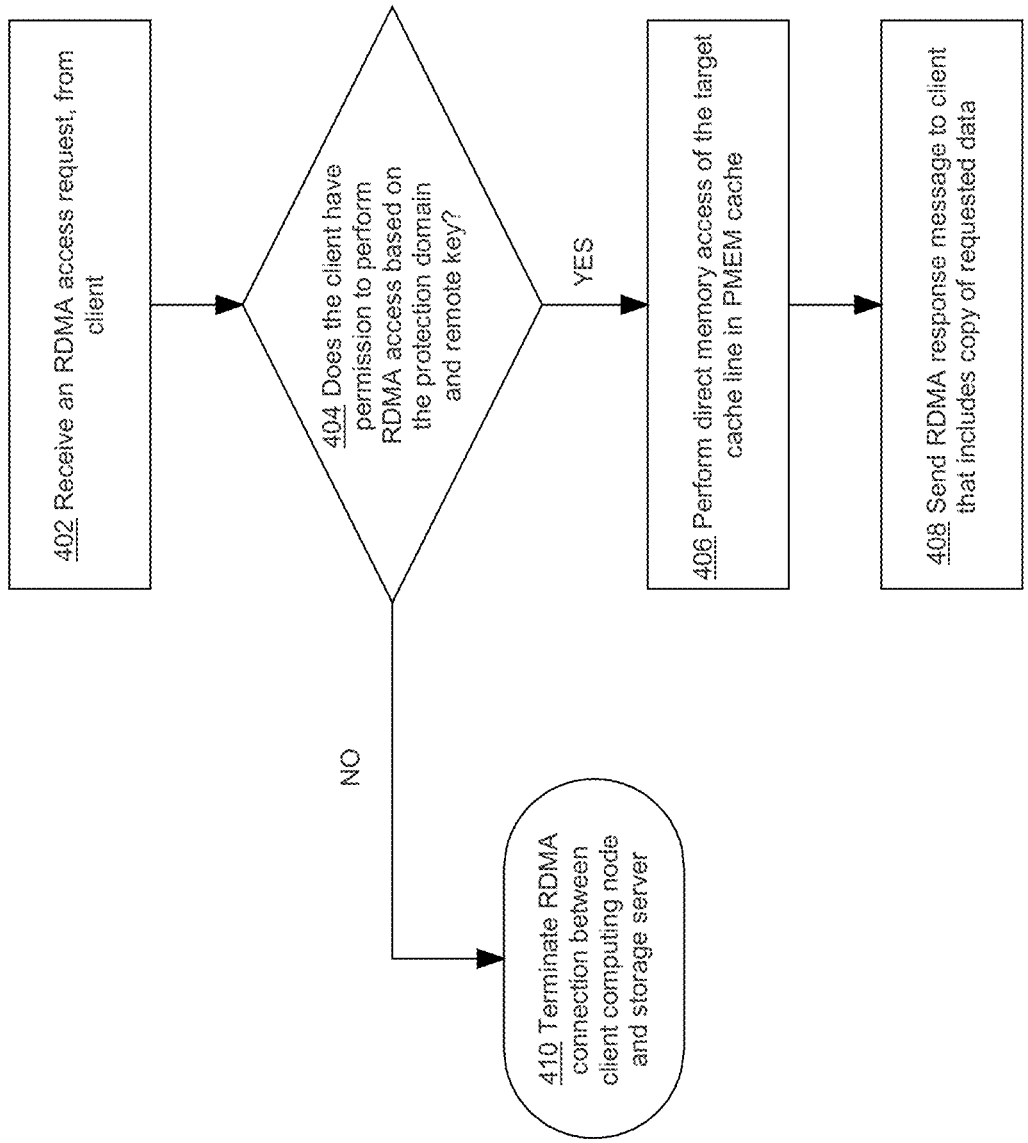
FIG. 4 is a flow chart depicting operations performed upon receiving an RDMA access request from a client, according to an embodiment of the present invention.

FIG. 4 is a flow chart depicting operations performed upon receiving an RDMA access request from a client, according to an embodiment. According to at least one embodiment, RDMA access requests may be generated if the client has previously established an RDMA connection between the client and the storage cell 120 and a copy of the requested data is loaded in the PMEM cache 121. Receiving an RDMA access request operation is illustrated using DB process 105-1*a* on computing node 102-1 and storage process 125 on storage cell 120. DB process 105-1*a* may initiate a read or write operation to either read a data block or write to a data block. Storage service 112-1 may receive a request from DB process 105-1*a* and determine the home location for the data block searching a data dictionary, stored in main memory 104-1. Once the home location for the data block is determined, storage service 112-1 may determine whether the requested data may be accessed using an RDMA access request. As described, in order for an RDMA access request to be issued, an active RDMA connection needs to be available between computing node 102-1 and storage cell 120 and a copy of the requested data needs to be loaded in the PMEM cache 121. The storage service 112-1 may check whether an active RDMA connection exists by checking the table configuration information stored in main memory 104-1. If an active RDMA connection exists then the storage service 112-1 may scan a local copy of the portion of the RDMA table 122, stored in the main memory 104-1, to determine whether there is a cache hit for the requested data. If there is a cache hit, then that means the requested data has been loaded in the PMEM cache 121 and the storage service 112-1 may generate an RDMA access request for the requested data. As described, the RDMA access request generated by computing node 102-1 contains at least a remote key that corresponds to the cache line that contains the requested data and the protection domain identifier. The protection domain identifier is derived based upon the database cluster identifier and database ID.

Operations described in FIG. 4 are described in the context of a read request however, the operations may also apply to a request to write data to a data block. At block 402 the storage cell receives an RDMA access request, from a client computing node. In an embodiment, the network adapter 124 of the storage cell 120 receives the RDMA access request. The RDMA access request contains a protection domain identifier for the requesting client, the corresponding remote key for the cache line that contains the requested data, and a home location address for the requested data. As described, the network adapter 124 is an RNIC which supports an RDMA protocol, such that the network adapter 124 is configured to receive RDMA access requests from a computing node, determine whether the requestor has appropriate permissions to access the requested data, and access copies of data stored in the PMEM cache 121.

At decision diamond 404, it is determined whether the client has permissions to perform an RDMA access of the cache line that contains the copy of the requested data based on access credentials and the remote key. Access credentials may represent the protection domain identifier for the requesting client. In an embodiment, the network adapter 124 queries the RDMA table 122 to determine whether the protection domain identifier associated with the cache line matches the protection domain identifier in the RDMA access request for the remote key specified in the access request. If the protection domain identifier associated with the cache line, identified using the remote key, does not match the protection domain identifier in the RDMA access request then the client does not have permission to access the copy of the data in the cache line. The process would then proceed to block 410. At block 410, the network adapter 124 terminates the RDMA access request and terminates the RDMA connection between the computing node 102-1 and the storage cell 120. Termination of the RDMA connection may occur to ensure that clients, using invalid credentials, have their RDMA connection information and table configuration information reset. Scenarios in which clients have invalid credentials may include, but are not limited to, the PMEM cache 121 reusing existing cache lines and clients intentionally trying to access unauthorized data. In one example, the cache manager 126 may reassign cache lines to other clients that need additional cache space within the PMEM cache 121. If this occurs, then the storage process 125 may update the records in the RDMA table 122 to reflect the reassignment of cache lines. Updated copies of the portions of the RDMA table 122 may then be sent to clients. However, if an RDMA access request is generated by a client, prior to receiving the updated copy of the portion of the RDMA table 122, then the RDMA access request may specify an invalid protection domain identifier and/or remote key. As a result, the network adapter 124, upon determining that the client does not have the correct permissions for the requested cache line, may terminate the RDMA connection in order to trigger updated RDMA connection information and table configuration information to be sent to the client.

In another example, if the client is purposely trying to access an unauthorized cache line, then, as a security measure, the network adapter 124 may terminate the RDMA connection. Referring to FIG. 2A, if a client associated with protection domain C1.DB3, which is authorized to access the cache line referenced by record 202-N attempts to access the cache line represented by record 202-1, which is assigned to another client (protection domain C1.DB1), then this RDMA access request would be identified as an unauthorized request and the RDMA connection between the unauthorized client and the storage cell 120 would be terminated at block 410.

If however, at decision diamond 404, the network adapter 124 determines that the cache line protection domain identifier matches the protection domain identifier in the RDMA access request, then the client has permission to access the copy of the data in the cache line. Since protection domain identifiers are based upon a cluster identifier and a database identifier, different instances of a database instantiated on different computing nodes would have access to the same set of cache lines within the PMEM cache 121. For example, instance 103-2a running DB process 105-2a on computing node 102-2, which represents database 1 on cluster 1, would have the same protection domain identifier as instance 103-1a running DB process 105-1a on computing node 102-1. As a result, RDMA access requests originating from requests from either instance 103-1a or 103-2a would have authorization to access the cache line corresponding to record 202-1, which has a protection domain identifier as C1.DB1.

At block 406, the network adapter 124 processes the RDMA access request by performing a direct memory access of the target cache line in the PMEM cache 121. Specifically, the network adapter 124 retrieves a copy of the target cache line from the PMEM cache 121.

At block 408, an RDMA response message that includes the copy of the requested data is sent to the client. In an embodiment, the network adapter 124 generates a response message that includes the copy of the requested data and sends the response message back to the computing node 102-1 via the RDMA connection queues.

The response message is then received by the network adapter 109-1 on computing node 102-1. The network adapter 109-1 then loads the copy of the requested data into the database buffer pool 108-1. The DB process 105-1a may then access the requested data.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
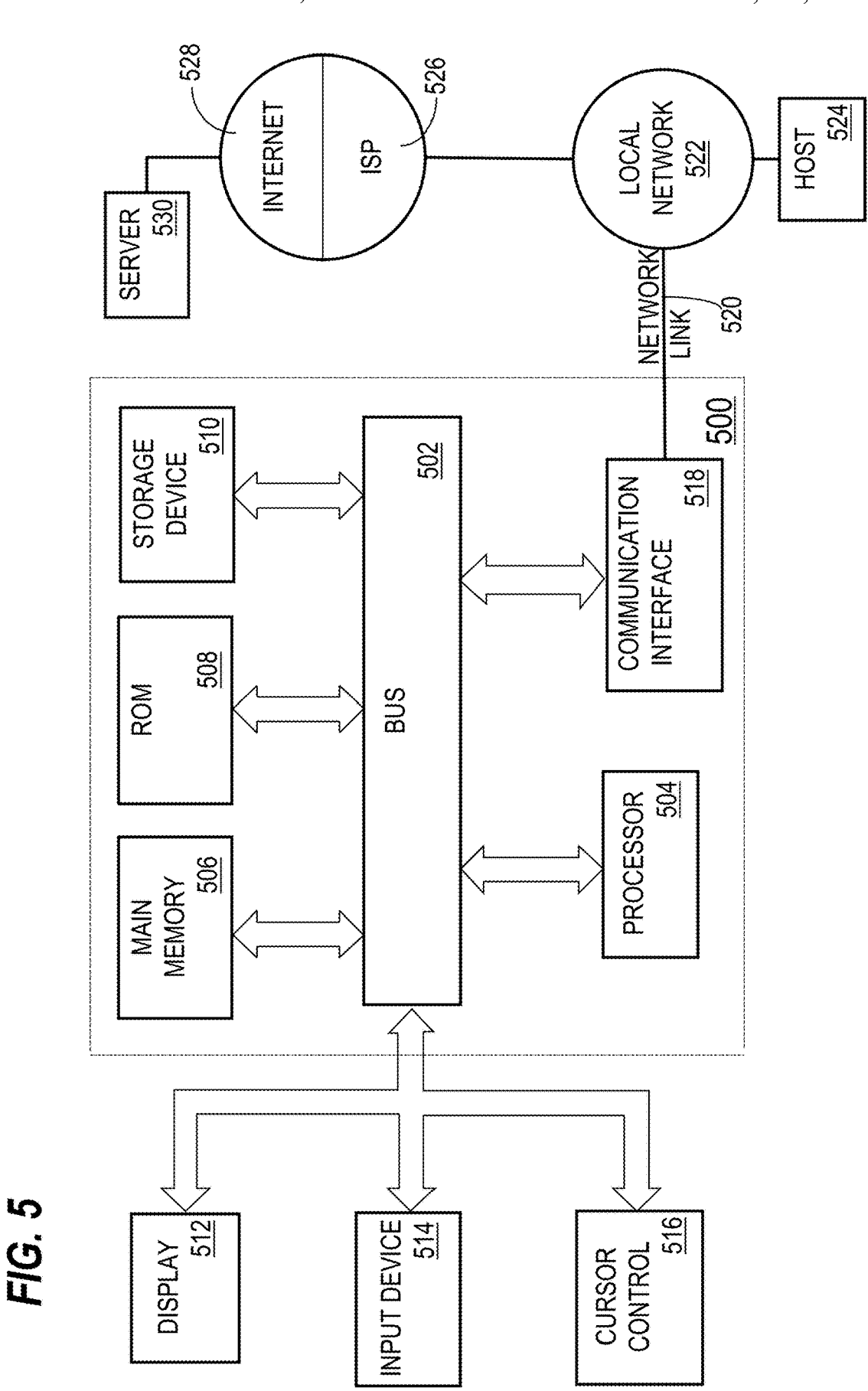
FIG. 5 is a block diagram depicting a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 6:
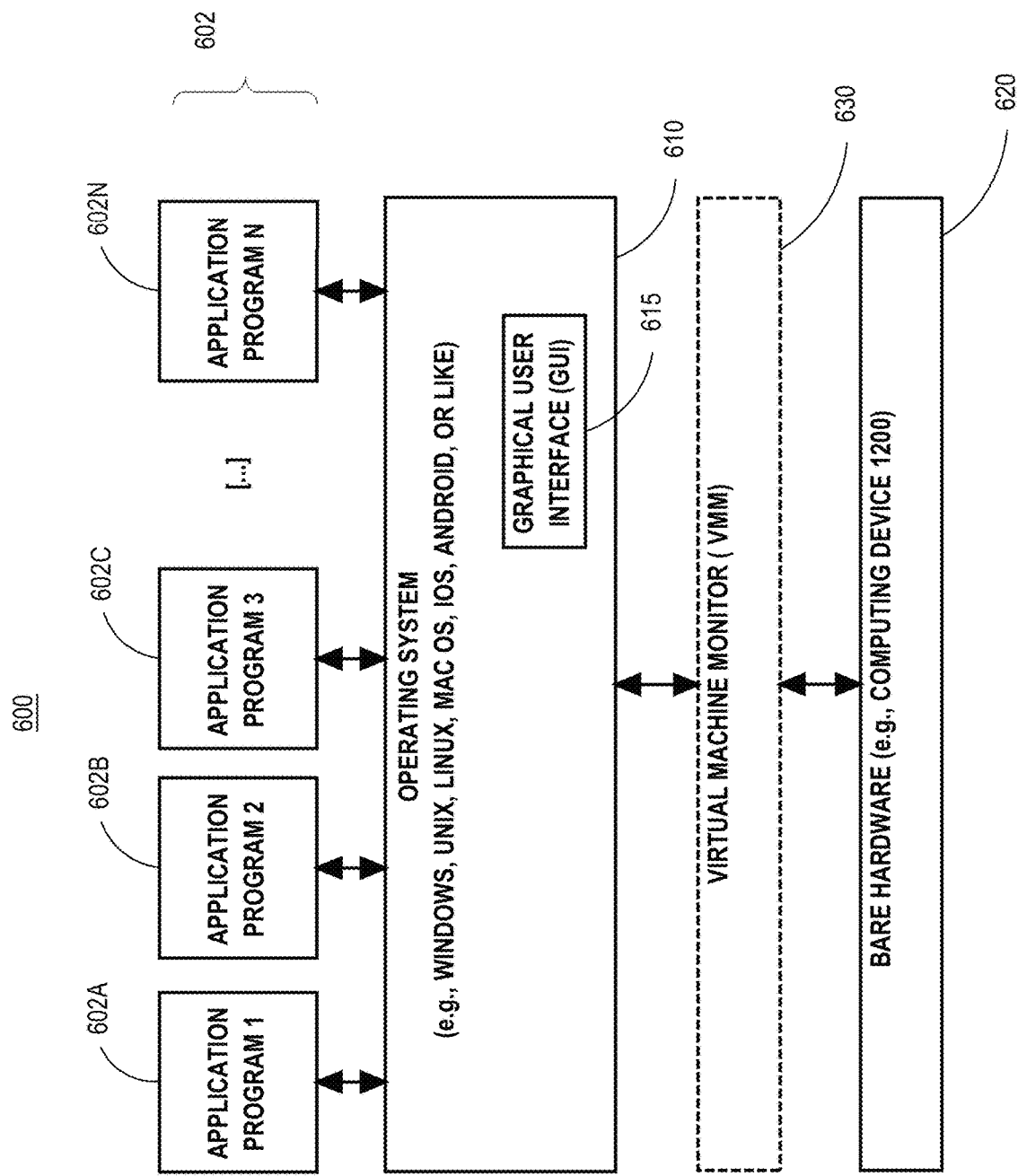
FIG. 6 is a diagram of a software system that may be employed for controlling the operation of a computer system according to an embodiment of the present invention.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

EXTENSIONS AND ALTERNATIVES

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation. In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
    a storage server maintaining a persistent memory (PMEM) cache comprising a plurality of cache lines, each cache line of said plurality of cache lines caching an allocation unit of block-based storage managed by said storage server;
    the storage server maintaining a Remote Direct Memory Access (RDMA) table that includes a plurality of table entries, each table entry of said plurality of table entries:
        mapping a respective storage server client of a plurality of storage server clients to respective one or more cache lines of said plurality of cache lines that cache an allocation unit for said respective storage server client, and
        including a respective remote access key value for accessing said respective one or more cache lines using RDMA access;
    establishing an RDMA connection between said storage server and a particular storage server client of said plurality of storage server clients;
    after establishing said RDMA connection, said storage server sending one or more table entries of said plurality of table entries to said particular storage server client, said one or more table entries including a particular table entry of said plurality of table entries that includes a particular remote access key value for a particular cache line of said plurality of cache lines;
    after sending one or more table entries, receiving, via said RDMA connection from said particular storage se client, a RDMA request to access said particular cache line, said RDMA request including said particular remote access key value included in said particular table entry;
    identifying, by the storage server, access credentials associated with the particular storage server client;
    determining whether the particular storage server client has permission to perform an RDMA access to the particular cache line based on the access credentials and the particular remote access key value; and
    upon determining that the particular storage server client has permission to perform the RDMA access, accessing and sending the particular cache line from said PMEM cache to the particular storage server client.

2. The method of claim 1, further comprising, upon determining that the particular storage server client does not have permission to perform the RDMA access, terminating a connection between the particular storage server client and the storage server.

3. The method of claim 1, wherein said RDMA connection is between a first host channel adapter on the particular storage server client and a second host channel adapter on the storage server.

4. The method of claim 1, wherein the RDMA table is stored within the PMEM cache.

5. The method of claim 1,
    wherein the RDMA request to access the particular cache line originated from a database process for a particular database cluster and particular database instantiated on the particular storage server client; and
    wherein the access credentials are based on the particular database cluster and the particular database.

6. The method of claim 1, wherein determining whether the particular storage server client has permission to perform the RDMA access to the particular cache line, comprises:
    accessing, in the RDMA table, a record associated with the particular cache line using the particular remote access key value;
    determining whether access credentials associated with the record match the access credentials associated with the particular storage server client.

7. The method of claim 6, wherein determining whether the particular storage server client has permission to perform the RDMA access to the particular cache line is performed by a host channel adapter on the storage server.

8. The method of claim 1, further comprising:
    prior to receiving the RDMA request to access the particular cache line, receiving, from the particular storage server client, a request to access one or more data blocks stored on the storage server;
    identifying, by the storage server, the access credentials associated with the particular storage server client;
    determining whether a copy of the one or more data blocks is stored in the PMEM cache;
    upon determining that the copy of the one or more data blocks are not stored in the PMEM cache:
        allocating, by the storage server, one or more cache lines in the PMEM cache for storing the copy of the one or more data blocks;
        associating, by the storage server, the one or more cache lines to the particular storage server client;
        loading, by the storage server, the copy of the one or more data blocks into the one or more cache lines;

sending the copy of the one or more data blocks to the particular storage server client.

9. The method of claim 1, further comprising:
prior to receiving the RDMA request to access the particular cache line:
receiving, from the particular storage server client, a request to access one or more data blocks stored on the storage server;
determining whether the particular storage server client is associated with the access credentials;
upon determining that the particular storage server client is not associated with the access credentials, generating, by the storage server, the access credentials for the particular storage server client based on a particular database cluster and a particular database associated with the particular storage server client;
allocating, by the storage server, one or more cache lines in the PMEM cache for storing a copy of the one or more data blocks;
associating, by the storage server, the one or more cache lines to the particular storage server client;
loading, by the storage server, the copy of the one or more data blocks into the one or more cache lines;
sending the copy of the one or more data blocks to the particular storage server client.

10. The method of claim 9, wherein generating the access credentials for the particular storage server client comprises:
generating an access credential value based on the particular database cluster and the particular database associated with the particular storage server client;
storing the access credential value in a data structure loaded in volatile memory and associated with the RDMA table.

11. One or more non-transitory storage media storing one or more sequences of instructions which, when executed by one or more computing devices, cause:
a storage server maintaining a persistent memory (PMEM) cache comprising a plurality of cache lines, each cache line of said plurality of cache lines caching an allocation unit of block-based storage managed by said storage server;
the storage server maintaining a Remote Direct Memory Access (RDMA) table that includes a plurality of table entries, each table entry of said plurality of table entries:
mapping a respective storage server client of a plurality of storage server clients to respective one or more cache lines of said plurality of cache lines that cache an allocation unit for said respective storage server client, and
including a respective remote access key value for accessing said respective one or more cache lines using RDMA access;
establishing an RDMA, connection between said storage server and a particular storage server client of said plurality of storage server clients;
after establishing said RDMA connection, said storage server sending one or more table entries of said plurality of table entries to said particular storage server client, said one or more table entries including a particular table entry of said plurality of table entries that includes a particular remote access key value for a particular cache line of said plurality of cache lines;
after sending one or more table entries, receiving, via said RDMA connection from said particular storage server client, a RDMA request to access said particular cache line, said RDMA request including said particular remote access key value included in said particular table entry;
identifying, by the storage server, access credentials associated with the particular storage server client;
determining whether the particular storage server client has permission to perform an RDMA access to the particular cache line based on the access credentials and the particular remote access key value; and
upon determining that the particular storage server client has permission to perform the RDMA access, accessing and sending the particular cache line from said PMEM cache to the particular storage server client.

12. The one or more non-transitory computer-readable media of claim 11, wherein the one or more sequences of instructions include instruction that, when executed by said one or more computing devices cause upon determining that the particular storage server client does not have permission to perform the RDMA access, terminating a connection between the particular storage server client and the storage server.

13. The one or more non-transitory computer-readable media of claim 11, wherein said RDMA connection is between a first host channel adapter on the particular storage server client and a second host channel adapter on the storage server.

14. The one or more non-transitory computer-readable media of claim 11, wherein the RDMA table is stored within the PMEM cache.

15. The one or more non-transitory computer-readable media of claim 11,
wherein the RDMA request to access the particular cache line originated from a database process for a particular database cluster and particular database instantiated on the particular storage server client; and
wherein the access credentials are based on the particular database cluster and the particular database.

16. The one or more non-transitory computer-readable media of claim 11, wherein determining whether the particular storage server client has permission to perform the RDMA access to the particular cache line, comprises:
accessing, in the RDMA table, a record associated with the particular cache line using the particular remote access key value;
determining whether access credentials associated with the record match the access credentials associated with the particular storage server client.

17. The one or more non-transitory computer-readable media of claim 16, wherein determining whether the particular storage server client has permission to perform the RDMA access to the particular cache line is performed by a host channel adapter on the storage server.

18. The one or more non-transitory computer-readable media of claim 11, wherein the one or more sequences of instructions include instruction that, when executed by said one or more computing devices cause:
prior to receiving the RDMA request to access the particular cache line, receiving, from the particular storage server client, a request to access one or more data blocks stored on the storage server;
identifying, by the storage server, the access credentials associated with the particular storage server client;
determining whether a copy of the one or more data blocks is stored in the PMEM cache;
upon determining that the copy of the one or more data blocks are not stored in the PMEM cache:

allocating, by the storage server, one or more cache lines in the PMEM cache for storing the copy of the one or more data blocks;

associating, by the storage server, the one or more cache lines to the particular storage server client;

loading, by the storage server, the copy of the one or more data blocks into the one or more cache lines;

sending the copy of the one or more data blocks to the particular storage server client.

19. The one or more non-transitory computer-readable media of claim 11, wherein the one or more sequences of instructions include instruction that, when executed by said one or more computing devices cause:

prior to receiving the RDMA request to access the particular cache line, receiving, from the particular storage server client, a request to access one or more data blocks stored on the storage server;

determining whether the particular storage server client is associated with the access credentials;

upon determining that the particular storage server client is not associated with the access credentials, generating, by the storage server, the access credentials for the particular storage server client based on a particular database cluster and a particular database associated with the particular storage server client;

allocating, by the storage server, one or more cache lines in the PMEM cache for storing a copy of the one or more data blocks;

associating, by the storage server, the one or more cache lines to the particular storage server client;

loading, by the storage server, the copy of the one or more data blocks into the one or more cache lines;

sending the copy of the one or more data blocks to the particular storage server client.

20. The one or more non-transitory computer-readable media of claim 19, wherein generating the access credentials for the particular storage server client comprises:

generating an access credential value based on the particular database cluster and the particular database associated with the particular storage server client;

storing the access credential value in a data structure loaded in volatile memory and associated with the RDMA table.

* * * * *

UNITED STATES PATENT AND TRADEMARK OFFICE
CERTIFICATE OF CORRECTION

PATENT NO. : 11,573,719 B2
APPLICATION NO. : 16/831337
DATED : February 7, 2023
INVENTOR(S) : Zhang et al.

Page 1 of 1

It is certified that error appears in the above-identified patent and that said Letters Patent is hereby corrected as shown below:

In the Specification

In Column 6, Line 58, delete "InfinitiBand" and insert -- InfiniBand --, therefor.

In Column 23, Line 5, delete "DbaaS" and insert -- DBaaS --, therefor.

In the Claims

In Column 24, Line 4, in Claim 1, delete "se" and insert -- server --, therefor.

In Column 25, Line 55, in Claim 11, delete "RDMA," and insert -- RDMA --, therefor.

In Column 26, Line 18, in Claim 12, delete "devices" and insert -- devices, --, therefor.

In Column 26, Line 57, in Claim 18, delete "devices" and insert -- devices, --, therefor.

In Column 27, Line 13, in Claim 19, delete "devices" and insert -- devices, --, therefor.

Signed and Sealed this
Nineteenth Day of December, 2023

Katherine Kelly Vidal
*Director of the United States Patent and Trademark Office*